United States Patent
Kiep

(10) Patent No.: US 7,023,184 B2
(45) Date of Patent: Apr. 4, 2006

(54) DC-DC CONVERTER WITH STABILIZED OUTPUT VOLTAGE

(75) Inventor: Andreas Kiep, Munich (DE)

(73) Assignee: Infineon Technoloiges AG, Munich (DE)

( * ) Notice: Subject to any disclaimer, the term of this patent is extended or adjusted under 35 U.S.C. 154(b) by 0 days.

(21) Appl. No.: 10/824,252

(22) Filed: Apr. 14, 2004

(65) Prior Publication Data

US 2004/0257051 A1    Dec. 23, 2004

(30) Foreign Application Priority Data

Apr. 15, 2003 (DE) .............................. 103 17 380

(51) Int. Cl.
*G04F 1/656* (2006.01)
(52) U.S. Cl. .................. 323/222; 323/224; 323/284
(58) Field of Classification Search ............. 323/222, 323/284, 224
See application file for complete search history.

(56) References Cited

U.S. PATENT DOCUMENTS 5,761,055 A * 6/1998 Okada et al. ........... 363/56.08
6,320,358 B1 * 11/2001 Miller ..................... 323/222
6,630,817 B1 * 10/2003 Kison et al. ............. 323/274
6,642,696 B1 * 11/2003 Tateishi .................. 323/222
6,710,582 B1 * 3/2004 Watanabe ................ 323/222
6,737,842 B1 * 5/2004 Bai et al. ................. 323/282
6,819,088 B1 * 11/2004 Shenai et al. ............ 323/222

OTHER PUBLICATIONS

Köstner, R. et al., "Electronic Circuits: with 43 Tables and 68 Tasks," Study Books of the Engineering Sciences, ISBN 3-446-16588-6, pp. 281-286, (1993).

* cited by examiner

*Primary Examiner*—Bao Q. Vu
(74) *Attorney, Agent, or Firm*—Dicke, Billig & Czaja, PLLC

(57) ABSTRACT

A DC-DC converter is provided with a series circuit formed by an inductor and a capacitor, an output voltage for a load being tapped off across the capacitor and the load bringing about a load current. The converter also has a changeover switch for connecting an input voltage to the series circuit or for short-circuiting the series circuit and a control circuit for controlling the changeover switch in such a way that the changeover switch alternately short-circuits the series circuit or connects it to the input voltage. The converter also has a means for increasing a resistance in series with the series circuit at least in the event of the series circuit being short-circuited by means of the changeover switch, if the load current falls by a specific value.

18 Claims, 4 Drawing Sheets

VG1 ——
VG2 - - - -

VG1 ——
VG2 - - - -

PATENT_US_7023184_B2

DC-DC CONVERTER WITH STABILIZED OUTPUT VOLTAGE

CROSS-REFERENCE TO RELATED APPLICATIONS

This Utility Patent Application claims priority to German Patent Application No. DE 103 17 380.3, filed on Apr. 15, 2003, which is incorporated herein by reference.

BACKGROUND

The invention relates to DC-DC converters, and in particular those that convert a higher input voltage into a lower output voltage.

Such DC-DC converters are disclosed for example in R. Köstner, A. Möschwitzer, "Elektronische Schaltungen" ["Electronic circuits"] Hansa-Verlag 1993, pages 281 to 286, and comprise a series circuit formed by an inductor and a capacitor, an output voltage for a load being tapped off across the capacitor and the load bringing about a load current, and also a changeover switch for connecting an input voltage to the series circuit or for short-circuiting the series circuit. The changeover switch is controlled by a control circuit in such a way that the changeover switch alternately for example short-circuits the series circuit for a first time duration or connects it to the input voltage for a second time duration. The ratio of the time durations (pulse width modulation) is regulated in accordance with the desired output voltage.

One problem in the case of such DC-DC converters is the dynamic behavior in the case of small output voltages and, in particular, the stability of the output voltage in the case of a changing load current. A small output voltage is to be understood as, for example, voltages of 5 V or less. In this case, primarily load current changes from large load currents to small load currents are problematic in particular when synchronous rectifiers are used rather than diodes as freewheeling components, said synchronous rectifiers being realized by correspondingly driven field-effect transistors.

Such a DC-DC converter is illustrated by way of example in FIG. 1. In this case, a push-pull output stage serving as a changeover switch has two transistors $Q_1$ and $Q_2$, which respectively have a correspondingly biased diode $D_1$ and a diode $D_2$ (body diodes) between their respective source and drain terminals. An input voltage $U_E$ is applied to the push-pull output stage in such a way that the input voltage $U_E$ is applied for example to the drain terminal of the transistor $Q_1$ used as a synchronous rectifier, while the source terminal of the transistor $Q_2$ is connected to ground M. The drain terminal of the transistor $Q_2$ and also the source terminal of the transistor $Q_1$ are connected up to one another and form the output of the push-pull output stage. The gate terminals of the transistors $Q_1$ and $Q_2$ are driven by a driver circuit DR by means of control voltages $V_{G1}$ and $V_{G2}$, the output terminal of the push-pull output stage serving as reference point for the control voltage $V_{G1}$ and ground M serving for the control voltage $V_{G2}$. The driver circuit DR is driven by a control circuit CTR, which feeds a pulse-width-modulated rectangular signal into the driver circuit DR.

A series circuit comprising a coil L and a capacitor C is connected between the output of the push-pull output stage and ground M, the inductor L having a parasitic resistance $R_S$ and the capacitor C having a parasitic resistance $R_P$, which, in terms of their effect, are in series with the inductor L and with the capacitor C, respectively. Within the series circuit, the inductor L is connected with respect to the output of the push-pull output stage and the capacitor C is connected with respect to ground M. At the tap between inductor L and capacitor C, it is possible to tap off an output voltage $U_A$ with respect to ground M. The output voltage $U_A$ feeds a load resistor $R_L$, which brings about an output current $I_A$.

A current $I_L$ flows into the inductor L, which current, depending on the switching state of the push-pull output stage, is essentially formed either by a current $I_{Q1}$ flowing through the transistor $Q_1$ or by a current $I_{Q2}$ flowing through the transistor $Q_2$.

As illustrated in FIG. 2, the current rise $di_L/dt$ in the inductor L with transistor $Q_1$ switched on is very much greater than the current fall $di_L/dt$ in the inductor L with transistor $Q_2$ switched on (transistor $Q_1$ switched off). The reason for this is that the driving voltage across the inductor L, for example in the case of an input voltage of 12 V and an output voltage of 1.5 V is very much greater if the transistor $Q_1$ is switched on and the transistor $Q_2$ is switched off.

This behavior is not problematic in the steady-state condition, that is to say, with a constant load current. The situation is different, however, in the case of rapid load current changes from high load to low load, that is to say for example, from full load to no load. The current $I_L$ in the inductor and the output current $I_A$ (load current) are large before the load current change, to be precise both are approximately of the same magnitude. If the load current returns abruptly to a very small value, then the impressed inductor current has to flow into the capacitor C. The current $I_L$ becomes smaller and smaller until it finally returns to the value of the output current $I_A$ (load current). In this case, it charges the capacitor C further, so that the output voltage $U_A$ increases. To a first approximation, the energy stored in the inductor L is in this case transferred to the capacitor C.

In the case of an opposite load change, by contrast, that is to say in the case of a change from small load to large load, firstly a very small or even no current $I_L$ flows in the inductor L, and virtually no output current $I_A$. If the load current and thus the output current $I_A$ suddenly become larger, then the increased current requirement must initially be covered from the capacitor C, while the current $I_L$ through the inductor L rises. In this case, the voltage across the capacitor C (approximately the output voltage $U_A$) decreases somewhat, to be precise, until the current $I_L$ in the inductor L has reached the magnitude of the output current $I_A$.

The difference between output current $I_A$ and current $I_L$ through the inductor L has to be supplied by the capacitor C or has to flow into the latter. In this case, its voltage and thus the output voltage $U_A$ decrease or increase. Since the rate of change of the current $I_L$ is very much lower in the case of a current fall than in the case of a current rise (see FIG. 2), this load change case, large load current to small load current, is very much more critical than the opposite case, i.e. the change in the output voltage (in this case increase) on account of the delayed current fall in the inductor is greater than in the case of a load rise. This case has to be taken thoroughly into consideration, particularly for DC-DC converters with small output voltages, a very narrow tolerance of the output voltage and/or a high load current (=much energy in the inductor L).

Conventional control circuits react to a load change solely with altered pulse width modulation, i.e. adaptation of the ratio of the switching times of the transistors $Q_1$ and $Q_2$. In particular, the switch-on duration of the transistor $Q_1$ is reduced in this case, the clocking being regularly continued. In the case where the load current suddenly decreases, the switch-on duration of the transistor $Q_1$ is shortened further in this case until finally it is actually no longer switched on. By contrast, the switch-on duration of the transistor $Q_2$ is correspondingly lengthened. Since, in the case of DC-DC converters with high output currents and small output voltages, the transistor $Q_2$ (low-side switch) has an on resistance of just a few milliohms, the power loss arising in the transistor $Q_2$ (high-side switch) is relatively small. The energy stored in the inductor L is therefore largely transferred to the capacitor C. This means that the output voltage $U_A$ may rise impermissibly.

SUMMARY

One embodiment of the present invention provides DC-DC converters in such a way that no or at least only a small increase in the output voltage occurs in the event of load shedding. This reduces a rise in the output voltage in the event of load shedding without a high additional circuitry outlay.

In the case of a DC-DC converter, this is achieved by increasing means for increasing a resistance in series with the series circuit comprising inductor and capacitor at least in the event of the series circuit being short-circuited by means of the changeover switch, if the load current falls by a specific value. One embodiment of the invention thus proposes, in the case of a load change from high load currents to small load currents, converting at least part of the energy stored in the inductor in a different component than the capacitor, carrying the output voltage, as a power loss. In this way, less energy is transferred to said capacitor, so that the voltage of said capacitor and thus the output voltage are not or not significantly increased. This (if appropriate additional) component brings about the increase in resistance only in the case of load shedding, however, so that the "normal" mode of operation is not influenced.

In one embodiment, the changeover switch is realized by means of a push-pull output stage having a second transistor for short-circuiting and a first transistor for connection of the input voltage, one of the transistors serving as a synchronous rectifier.

In one embodiment, the power is converted in the event of load shedding into the changeover switch. For this purpose, the second transistor is advantageously controlled into a less conductive state by the control circuit when the load shedding occurs. This means that the excess power is at least partly converted in the event of a load shedding into the second transistor, so that the voltage across the capacitor and thus the output voltage do not rise significantly.

In one embodiment, either a metal oxide semiconductor field-effect transistor (MOS-FET) or a junction field-effect transistor (J-FET) may be provided as the second transistor. MOS-FETs generally have a parasitic diode (body diode), while J-FETs do not have such a diode. Thus, in the case of a MOS-FET, with regard to the example shown in FIG. 1, in the event of a load shedding, the first transistor ($Q_1$) would be switched off and the second transistor ($Q_2$) remains completely switched off or is at least partly turned off. The current $I_L$ of the inductor L then has to flow via the body diode ($D_2$) of the second transistor ($Q_2$), which is significantly more lossy than the current path through the second transistor $Q_2$ in the switched-on state. As a result, at least part of the energy of the inductor L is converted in the second transistor $Q_2$ instead of charging the capacitor C.

In the case of J-FETs, which do not have a body diode, or special MOSFETs without a body diode, these would be driven such that either the resistance would be increased by the second transistor itself, as a result of which energy would likewise be converted to an increased extent in the second transistor, or else both transistors are completely switched off, so that no appreciable current flows through them. In this case, the energy stored in the output inductor would be partially or completely converted into heat in a different component or else be transferred to a different energy store, such as e.g. a further capacitor. This means that the second transistor can be controlled in a range in which it completely or partly turns off.

Instead of implementing the increase in resistance in the case of load shedding within the changeover switch, it is also possible additionally to provide a third element, in particular a third transistor, which is controlled from the conductive state into a less conductive state in the event of a load current fall. In this case, the second transistor remains completely turned on or is likewise brought to a less conductive state. In this way, the power is converted in controlled fashion at the third transistor (or third and second transistor).

In this case, the third transistor may be connected with its load path in series with the load path of the second transistor, but may also be connected differently in series or in parallel (J-FET) with the inductor D.

In this case, the third transistor may be concomitantly controlled by the control circuit or, alternatively, be controlled autonomously by an additional monitoring device that evaluates the load current.

Finally, it may be provided that the load current is evaluated directly by the control device. For this purpose, a current measuring device is connected between capacitor and load. Load current fluctuations can thus be ascertained very accurately. In the event of less stringent requirements, however, it is also possible to dispense with a direct load current evaluation by evaluating voltage spikes across the capacitor with a specific gradient as an indication of a load shedding. As an alternative, the voltage across the load path of the transistor $Q_2$ or the voltage of the inductance L may be used for current measuring purpose. In addition, all other customary current measuring methods can also be employed.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
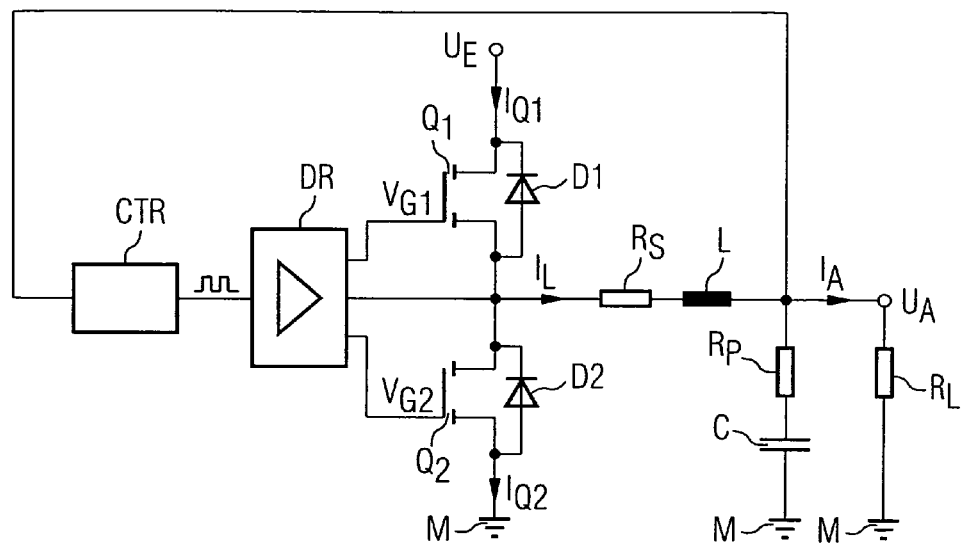
FIG. 1 illustrates the circuit diagram of a general embodiment of a known DC-DC converter for converting larger voltages into smaller voltages.
Figure 3:
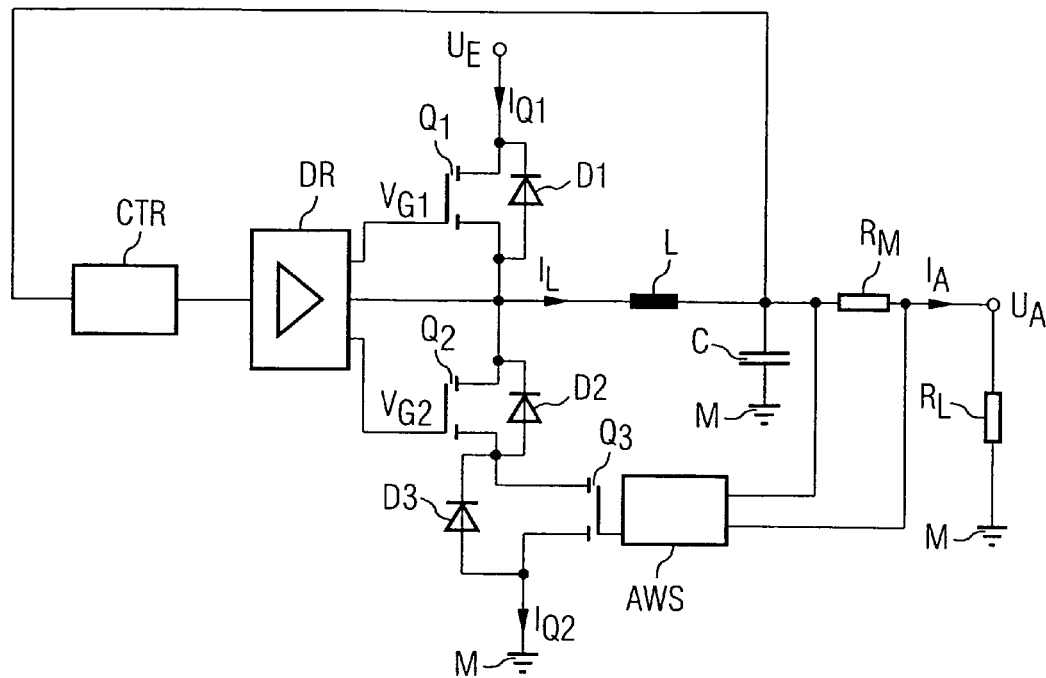
FIG. 3 illustrates a first exemplary embodiment of a DC-DC converter according to the invention.

The exemplary embodiment shown in FIG. 3 emerges from the known DC-DC converter shown in FIG. 1 by virtue of the fact that the load path of a further transistor $Q_3$ is connected into the source line of the transistor $Q_2$. As a result, the source terminal of the transistor $Q_3$ is connected to ground M and its drain terminal is connected up to the source terminal of the transistor $Q_2$. The transistor $Q_3$ is controlled by an evaluation circuit AWS, which, by means of a measuring resistor $R_M$ connected into the output line, determines the output current $I_A$ in such a way that it evaluates the voltage across the measuring resistor $R_M$ and, upon the occurrence of a voltage drop, i.e. a fall in the output current $I_A$, controls the transistor $Q_3$ from the conductive state into a less conductive state or even the off state.

The transistors used in the exemplary embodiment according to FIG. 3 are exclusively MOS-FETs and have, in parallel with their load path, reverse-biased parasitic diodes $D_1$ and $D_2$, i.e. so-called body diodes.

Immediately after a fall in the output current $I_A$, the transistor $Q_3$ is partly or completely turned off by the evaluation circuit AWS, the transistor $Q_1$ also being turned off by the control circuit CTR since the voltage $U_A$ likewise increases. This means that the current $I_L$ of the inductor L then has to flow via the body diode $D_3$, which is significantly more lossy then the current path through the transistor $Q_2$ and $Q_3$ in the switched-on state. As a result, at least part of the energy stored in the inductor L is converted in the transistor $Q_3$ instead of charging the capacitor C and thus increasing the output voltage $U_A$.

Furthermore, in the exemplary embodiment according to FIG. 3, the transistor $Q_2$ may also be turned off either by the evaluation circuit AWS or, alternatively, by the control circuit CTR, so that the body diodes $D_2$ and $D_3$ are then available for energy converting purposes.

Figure 2:
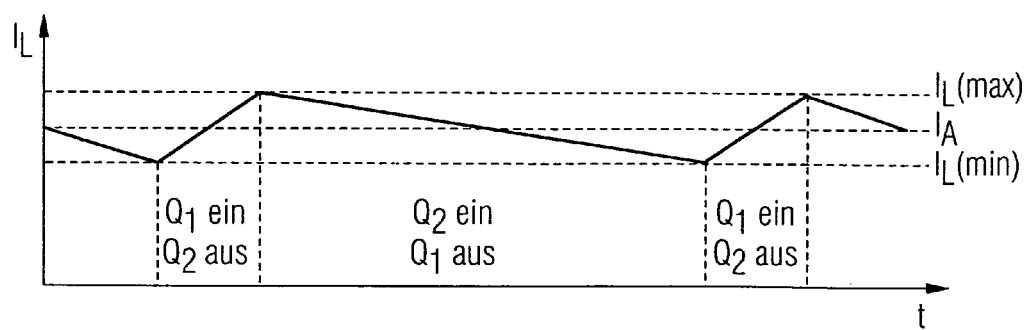
FIG. 2 illustrates the profile of the inductor current in the case of the DC-DC converter according to FIG. 1.
Figure 4:
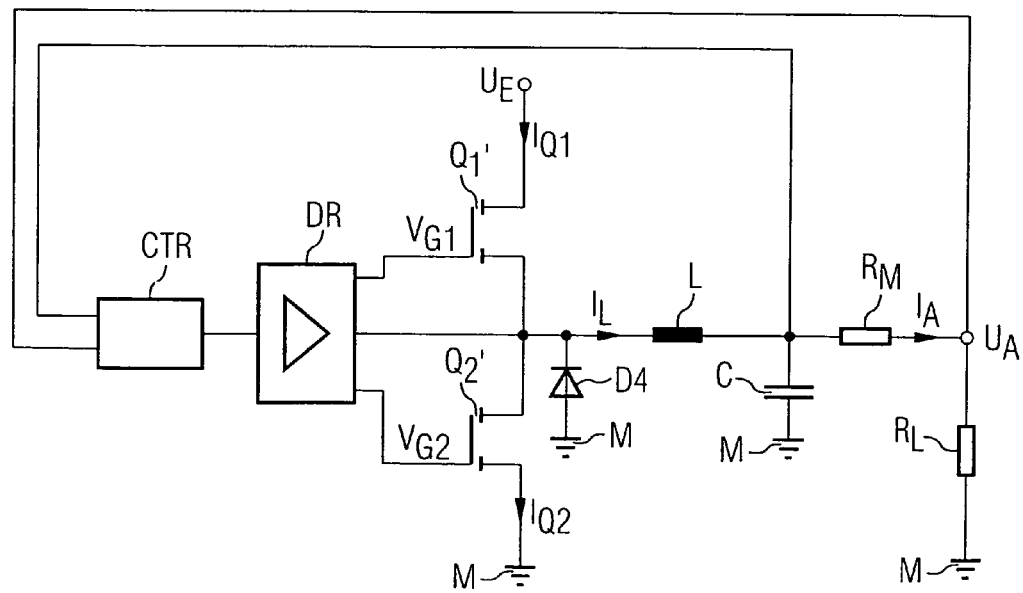
FIG. 4 illustrates a second exemplary embodiment of a DC-DC converter according to the invention.

The exemplary embodiment according to FIG. 4, likewise emerges from the known DC-DC converter set forth in FIG. 1, but instead of two MOS-FETs, two J-FETs $Q'_1$ and $Q'_2$ are used, which correspondingly replace the MOS-FETs $Q_1$ and $Q_2$ from FIG. 2. Furthermore, the measuring resistor $R_M$ is once again inserted into the load path, the voltage dropped across said measuring resistor then being evaluated by the control circuit CTR. Moreover, the control circuit CTR also furthermore evaluates the output voltage $U_A$.

As was also the case with the exemplary embodiment according to FIG. 3, the parasitic resistances $R_S$ and $R_P$ from FIG. 1 are omitted in the exemplary embodiment according to FIG. 4, for the sake of better clarity.

Since the J-FETs $Q'_1$ and $Q'_2$ used in the exemplary embodiment according to FIG. 4, do not have body diodes, when a load shedding occurs the transistor $Q'_2$ provided as a synchronous rectifier is not completely turned off, but rather only its resistance by a specific value which is suitable for converting the energy stored in the inductor L such that the output voltage $U_A$ is not or only insignificantly increased. In order to prevent the transistor $Q'_2$ from being over-loaded when it is turned on too slowly, it is possible, moreover, to provide a diode D4 in parallel with its load path, which has the same effect as the body diode D2 in FIG. 3.

Figure 5A:
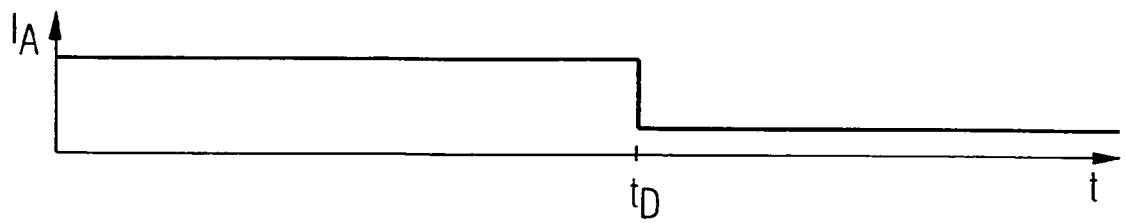
FIG. 5A illustrates the profile of the output current $I_A$ over T.
Figure 5B:
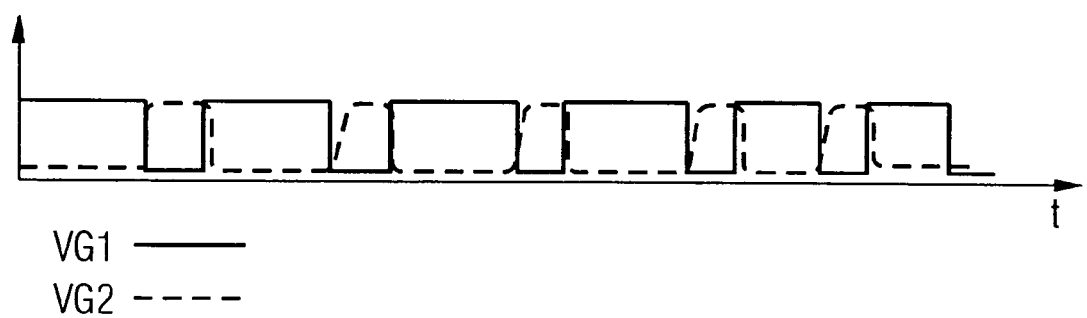
FIG. 5B illustrates the profile of the control voltages $V_{G1}$ and $V_{G2}$ as a function of the output current for the case without regulation according to the invention.
Figure 5C:
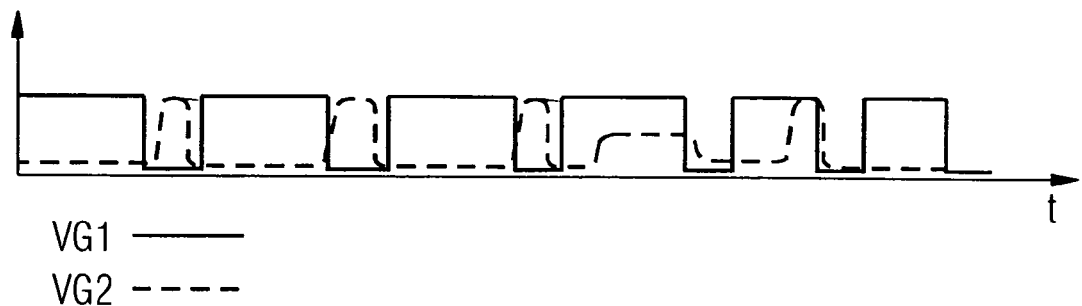
FIG. 5C illustrates the profile of the control voltages $V_{G1}$ and $V_{G2}$ as a function of the output current for the case with regulation according to the invention.

FIGS. 5A–C illustrate the comparison of the methods of operation of the DC-DC converters illustrated in FIGS. 1 and 4. FIG. 5A illustrates the profile of the output current $I_A$ over time T. In this case, the output current $I_A$ is assumed to be constant up to an instant $t_D$ at which the load current falls to almost approximately zero.

In the case of the arrangement according to FIG. 1, and in accordance with FIG. 5B, the control circuit will react in such a way that it reduces the pulse width modulation ratio after the instant $t_D$, so that the output voltage is corrected slowly to the old value again. FIG. 5B in this case reveals that the transistors $Q_1$ and $Q_2$ are driven inversely, that is to say that the voltage $V_{G1}$ is at a high level when the voltage $V_{G2}$ is at a low level, and vice versa.

By contrast, in the exemplary embodiment according to FIG. 4, and in accordance with FIG. 5C, starting from the instant $t_D$, the control voltage $V_{G1}$ is set to 0 and the transistor $Q'_1$ is thus turned off. The voltage $V_{G2}$ is set to a value such that the load path of the transistor $Q'_2$ represents a specific resistance via which the inductor L commutates. The control circuit CTR then effects further regulation of the output voltage $U_A$ again in a customary manner. Consequently, for a specific time after the occurrence of a load shedding, there is a significant difference in the mode of regulation between the known arrangement according to FIG. 1 and the arrangement according to the invention according to FIG. 4.

Figure 6A:
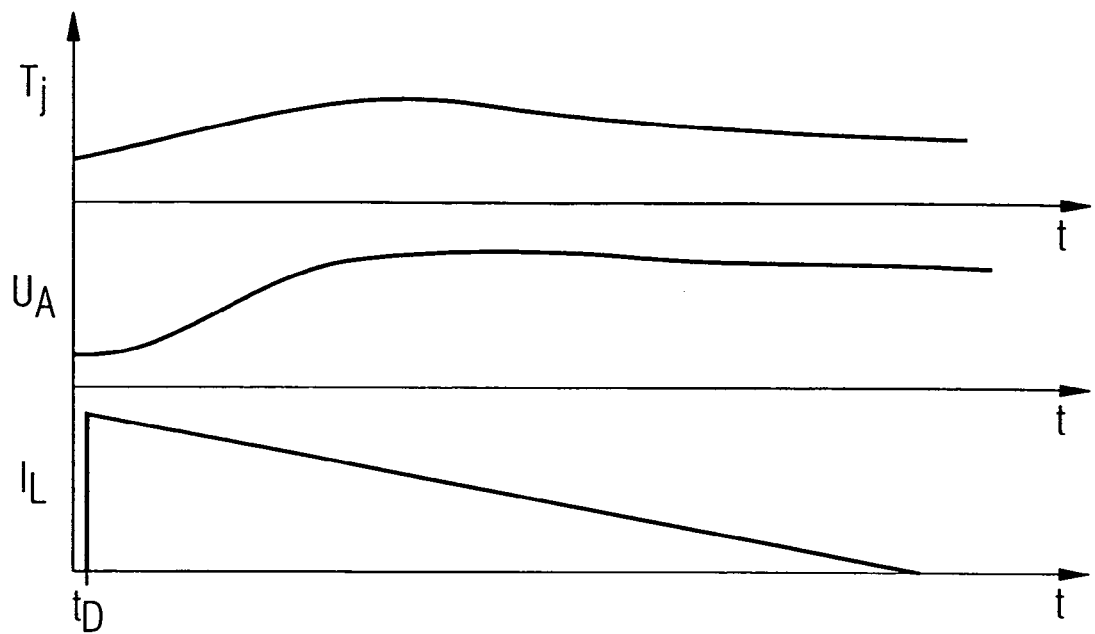
FIG. 6A illustrates the profile of various parameters in the case of a DC-DC converter without regulation according to the invention.
Figure 6B:
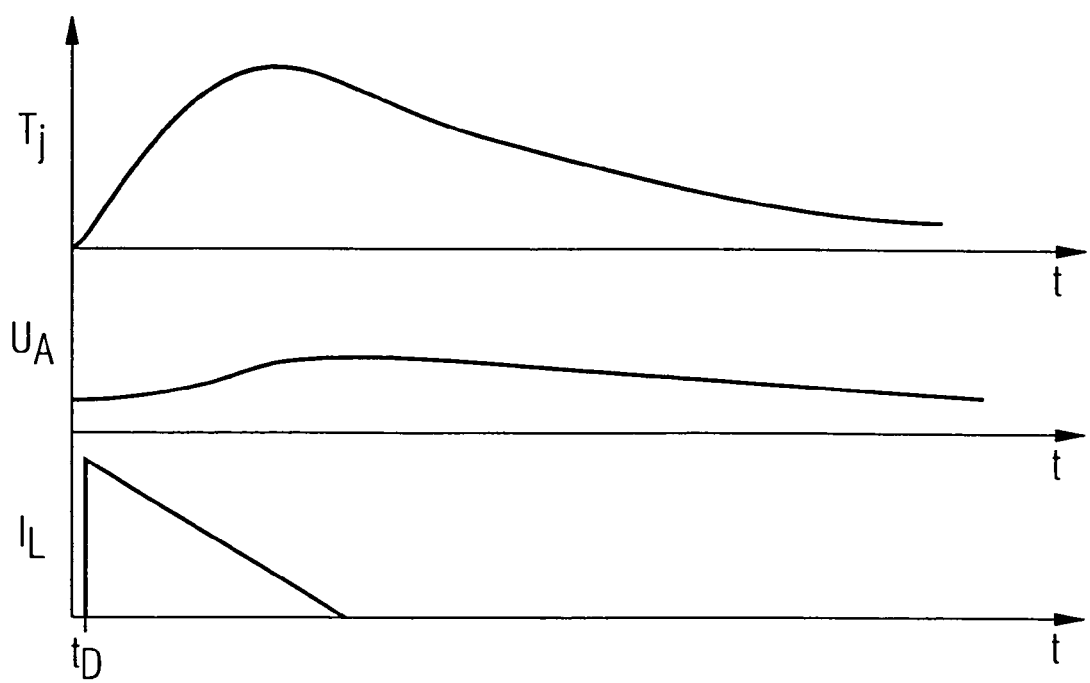
FIG. 6B illustrates the profile of various parameters in the case of a DC-DC converter with regulation according to the invention.

For further illustration, FIGS. 6A–B illustrate various parameters over time t after the occurrence of a load shedding at the instant $t_D$ for a DC-DC converter without (FIG. 6A) and with (FIG. 6B) regulation according to the invention. The parameters illustrated are, specifically, the temperature $T_j$ at the transistor $Q_2$ and at the transistor $Q'_2$, respectively, the voltage at the output $U_A$ and also the current $I_L$ in the inductor L. In the case of the known DC-DC converter (FIG. 6A), the profile of the transistor temperature $T_j$ exhibits a slow and moderate rise which in turn decreases slowly and moderately, whereas in the converter arrangement according to the invention, the temperature increases very rapidly to a high value in order then, however, also to fall rapidly again. It can be seen from this temperature profile that a high energy is converted momentarily in the transistor $Q'_2$. As can then be seen from the comparison of the output voltages, this energy is no longer available for increasing the output voltage $U_A$, as a result of which, in the case of regulation according to the invention, only a small voltage rise takes place, which then, however, also decays rapidly again (FIG. 6B). By contrast, in the case of a known DC-DC converter, the output voltage $U_A$ increases significantly and also remains in this state significantly longer, since the voltage has to be compensated for exclusively by the general regulating mechanism by means of pulse width modulation.

Finally, FIGS. 6A–B also illustrate the profile of the current $I_L$ which charges the capacitor C at the output. As can be seen, the current $I_L$ falls significantly faster in the case of the converter arrangement according to the invention in contrast to the known arrangement. Since the area enclosed by the current profile specifies the energy which flows into the capacitor, it can immediately be seen from FIGS. 6A–B that the capacitor C receives significantly less energy in the event of a load shedding in the case of a DC-DC converter according to the invention.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A DC-DC converter comprising:
    a series circuit formed by an inductor and a capacitor, an output voltage for a load being tapped off across the capacitor and the load bringing about a load current;
    a changeover switch for alternately connecting an input voltage to the series circuit or for short-circuiting the series circuit;
    a control circuit for controlling the changeover switch in such a way that the changeover switch alternately short-circuits the series circuit or connects it to the input voltage; and
    means for increasing a resistance in series with the series circuit at least in the event of the series circuit being short-circuited by means of the changeover switch, if the load current falls by a specific value.

2. The DC-DC converter of claim 1, wherein the changeover switch has a push-pull output stage with first and second transistors, wherein the first transistor is provided for connecting the input voltage to the series circuit and the second transistor is provided for short-circuiting the series circuit.

3. The DC-DC converter of claim 2, wherein the second transistor is provided as the means for increasing the resistance in series with the series circuit, and the second transistor is controlled into a less conductive state by the control circuit.

4. The DC-DC converter of claim 2, wherein the second transistor is a metal oxide semiconductor field-effect transistor.

5. The DC-DC converter of claim 2, wherein the second transistor is a junction field-effect transistor.

6. The DC-DC converter of claim 2, wherein the second transistor is provided as the means for increasing the resistance in series with the series circuit, the second transistor being controlled into the off state by the control circuit.

7. The DC-DC converter of claim 1, wherein a third transistor is provided as the means for increasing the resistance in series with the series circuit, said third transistor being controlled from the conductive state into a less conductive state when a load current decrease occurs.

8. The DC-DC converter of claim 7, wherein the third transistor is controlled by a monitoring device, which evaluates the load current.

9. The DC-DC converter of claim 1, wherein the load current is evaluated by the control device.

10. A DC-DC converter comprising:
    a series circuit formed by an inductor and a capacitor, an output voltage for a load being tapped off across the capacitor and the load bringing about a load current;
    a changeover switch for alternately connecting an input voltage to the series circuit or for short-circuiting the series circuit;
    a control circuit for controlling the changeover switch in such a way that the changeover switch alternately short-circuits the series circuit or connects it to the input voltage; and
    a control transistor that increases a resistance in series with the series circuit at least when the series circuit is short-circuited by the changeover switch, if the load current falls by a specific value.

11. The DC-DC converter of claim 10, wherein the changeover switch has a push-pull output stage with first and second transistors, wherein the first transistor is provided for connecting the input voltage to the series circuit and the second transistor is provided for short-circuiting the series circuit.

12. The DC-DC converter of claim 11, wherein the second transistor is provided as the control transistor for increasing the resistance in series with the series circuit, and the second transistor is being controlled into a less conductive state by the control circuit.

13. The DC-DC converter of claim 11, wherein the second transistor is a metal oxide semiconductor field-effect transistor.

14. The DC-DC converter of claim 11, wherein the second transistor is a junction field-effect transistor.

15. The DC-DC converter of claim 11, wherein the second transistor is provided as the control transistor for increasing the resistance in series with the series circuit, the second transistor being controlled into the off state by the control circuit.

16. The DC-DC converter of claim 10, wherein a third transistor is provided as the control transistor for increasing the resistance in series with the series circuit, said third transistor being controlled from the conductive state into a less conductive state when a load current decrease occurs.

17. The DC-DC converter of claim 16, wherein the third transistor is controlled by a monitoring device, which evaluates the load current.

18. The DC-DC converter of claim 10, wherein the load current is evaluated by the control device.

* * * * *

UNITED STATES PATENT AND TRADEMARK OFFICE
CERTIFICATE OF CORRECTION

PATENT NO. : 7,023,184 B2 Page 1 of 1
APPLICATION NO. : 10/824252
DATED : April 4, 2006
INVENTOR(S) : Andreas Kiep It is certified that error appears in the above-identified patent and that said Letters Patent is hereby corrected as shown below:

Cover page, Assignee (73), delete "Technoloiges" and insert in place thereof --Technologies--.

Cover page, Foreign Application Priority Data (30), delete "103 17 380" and insert in place thereof --103 17 380.3--.

Column 4, line 25, delete "or," and insert in place thereof --or--.

Signed and Sealed this

Twenty-fifth Day of December, 2007

JON W. DUDAS
*Director of the United States Patent and Trademark Office*